INVENTOR.
EDWARD A. FARRELL
BY
Robert J. Haase
ATTORNEY

United States Patent Office 3,435,249
Patented Mar. 25, 1969

3,435,249

SELECTABLE PULSE WIDTH MODULATOR USING BIASED SATURABLE TRANSFORMER

Edward A. Farrell, Uniondale, N.Y., assignor to Sperry Rand Corporation, Great Neck, N.Y., a corporation of Delaware Filed June 29, 1965, Ser. No. 467,989
Int. Cl. H03k 1/18
U.S. Cl. 307—88 5 Claims The present invention generally relates to high power selectable pulse width modulators and, more particularly, to such a modulator characterized by low level pulse width switching means.

Figure 1:
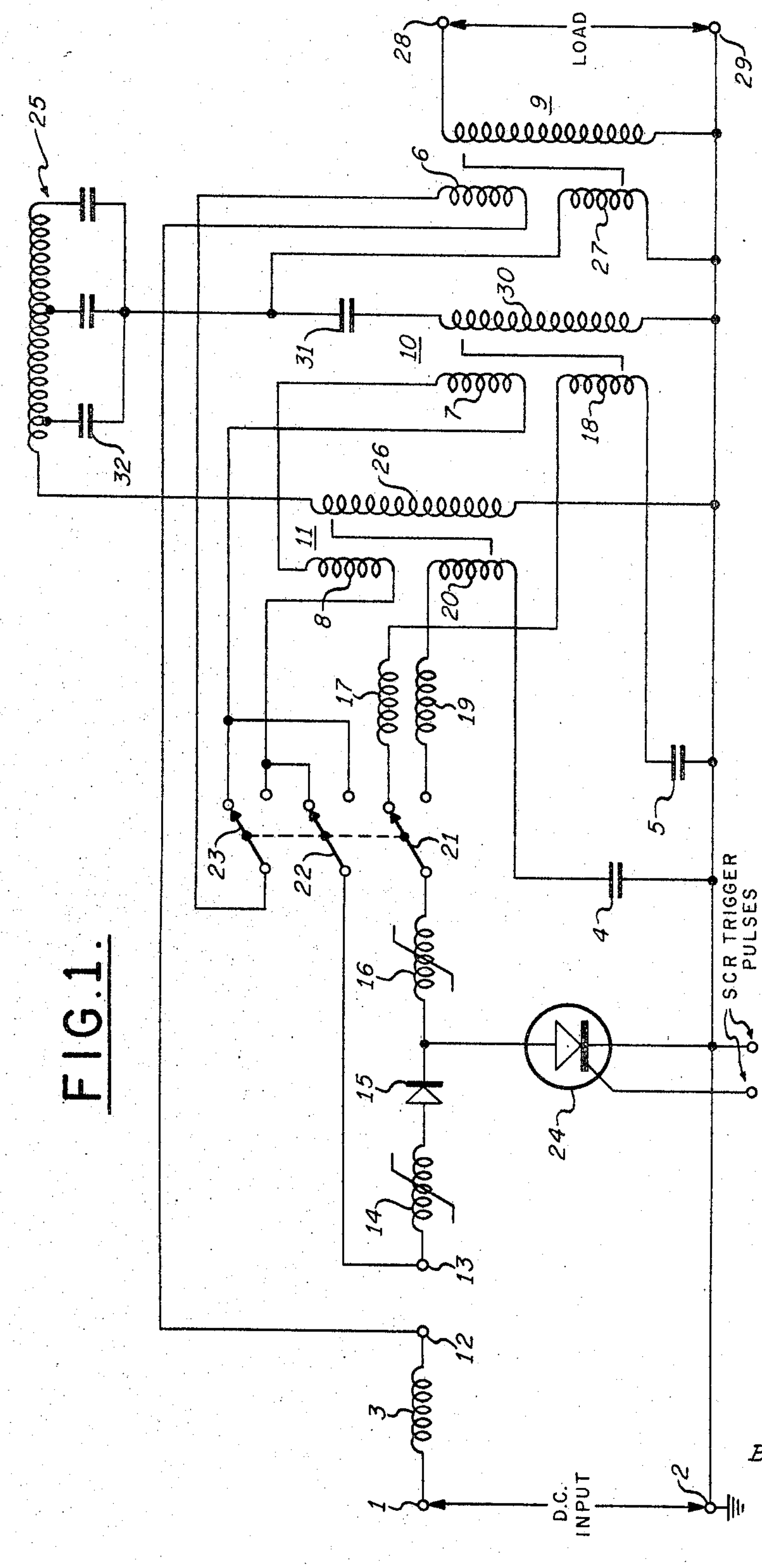

Many types of pulse modulators are known in the art for delivering high power pulses to high frequency oscillators such as, for example, magnetrons. In one familiar design, the high power pulse is generated in two successive steps by two cascaded transformer-coupled energy storage elements. In the first step, a low level storage element is resonantly charged from a direct current source. After the element is fully charged, it is discharged through a saturable interstage pulse transformer by closing a switch such as a silicon controlled rectifier. The transformer couples a high level storage element, e.g., a delay line, to the low level storage element whereby energy is transferred from the latter to the former element. When the energy transfer is completed, the interstage transformer reaches saturation. The low impedance presented by the saturated transformer to the charged high level storage element causes said element to discharge into the output load which may be, for example, a magnetron.

In certain applications, such as multiple range radar applications, it becomes desirable to deliver different modulator pulse widths to the magnetron. Generally, long pulses are required for long range target detection. At shorter ranges where less average transmitter power is needed, transmitted pulse width is reduced in order to increase range resolution. One known technique for changing pulse widths involves changing the high level energy storage element, e.g., changing the length of the pulse forming network delay line. However, this method requires the use of a switch capable of withstanding the very high voltages. In accordance with the present invention, however, pulse widths are changed by switching at low voltage levels between two separate energy storage means while leaving the high voltage connections of the pulse modulator intact. A feature of the invention is that the storage means not in use at a particular time is effectively isolated from the active storage means and from the load.

It is a principal object of the present invention to provide a pulse modulator capable of delivering high power pulses of selectable widths without requiring high voltage level switching.

Another object is to provide a selectable pulse width modulator in which selection is made at low voltage levels between a plurality of energy storage means which are effectively isolated from each other although permanently connected to the same output load.

These and other objects of the present invention, as will appear from a reading of the following specification, are achieved in the disclosed embodiment by the provision of a pulse modulator basically comprising a low level energy storage element and a high level energy storage element connected in cascade through an interstage saturable transformer. The low level storage element is resonantly charged from a D.C. source. After it is fully charged, the low level element is discharged through a triggered switch and the transformer into the high level storage element. Upon the completion of the charging of the high level storage element, the transformer is driven into saturation to initiate the discharging of the high level storage element into the load. The load is coupled to the high level storage element by an output saturable transformer which is saturated during the charging of said element and is unsaturated during its discharge into the load.

Provision is made in the present invention for the generation of pulses of two selectable widths. Pulse width selection is accomplished through the use of two separate low level storage elements, each having a respective high level storage element coupled to it through a respective interstage saturable transformer. Switching means are provided for connecting either one of the low level storage elements to the same resonant direct current charging source and to the same silicon controlled rectifier triggered switch. The two high level storage elements are coupled through the same output saturable transformer to the load. Each transformer is provided with a biasing winding. The bias windings are connected in series circuit with the D.C. charging source so that all three transformers are biased into saturation upon the occurrence of each charging of the selected low level storage element. The polarities of the bias windings are such that the selected interstage transformer and the output transformer are driven into negative saturation at the same time that the unselected interstage transformer is driven into positive saturation.

The bias windings are energized only at the start of each cycle of operation. They are de-energized for the remainder of each cycle of operation subsequent to the completion of the charging of the selected low level storage element. However, the remanent states into which the three transformers are initially set establishes the subsequent hysteresis loop excursions of the three transformers throughout the remainder of each cycle of operation whereby the unselected low level and high level storage transformer are effectively isolated from the selected low level and high level storage elements and its associated interstage transformer. Thus, isolation is maintained between the circuit elements in use and the circuit elements not in use without disturbing any of the high voltage circuit connections and while still permitting the selection of pulse width.

Figure 2:
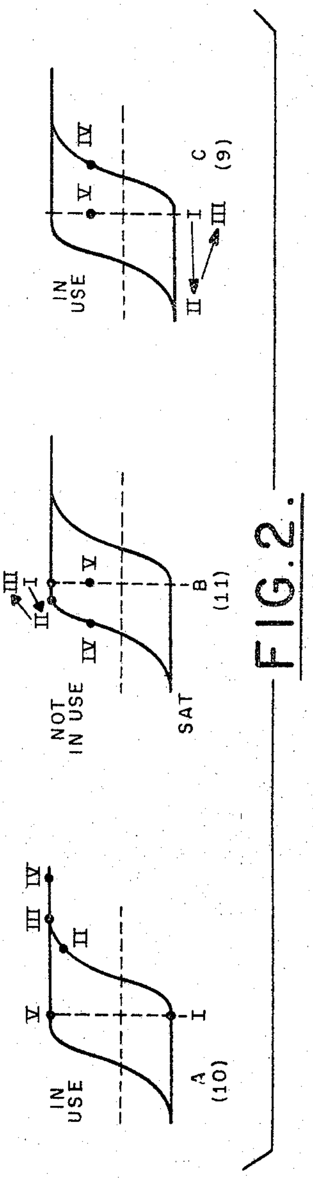

For a more complete understanding of the present invention, reference should be had to the following specification and to the appended figures of which:

FIGURE 1 is a schematic diagram of a typical embodiment of the present invention; and FIGURE 2 is a series of magnetization curves of the interstage and output transformers of FIGURE 1 useful in understanding the operation of the disclosed embodiment.

Referring to FIGURE 1, a direct current source (not shown) is coupled between input terminals 1 and 2, the latter of which is grounded. At the start of each cycle of operation, a charging current flows through inductance 3 and, ultimately, into a selected one of low level storage capacitors 4 and 5. The charging current path includes the bias windings 6, 7 and 8 of output transformer 9 and interstage transformers 10 and 11, respectively, which are connected in series circuit between points 12 and 13. The charging current path also includes saturable reactor 14, charging diode 15, saturable reactor 16, and a selected one of two low level energy storage elements. One of the storage elements includes inductor 17, primary 18 of interstage saturable transformer 10 and capacitor 5. The other storage element includes inductor 19, primary 20 of interstage saturable transformer 11 and capacitor 4. In the position shown, switch 21 selects the low level storage element comprising inductor 17, primary 18, and capacitor 5.

Switch 21 is ganged for movement with switches 22 and 23. Switches 22 and 23 reverse the connections of bias windings 7 and 8 with respect to bias winding 6. In operation, ganged switches 21, 22 and 23 cause the bias current to flow in the bias winding of the interstage transformer selected by switch 21 in the same sense that the current flows in the bias winding of output transformer 9. The connections established by switches 22 and 23 are such that bias current flows in the bias winding of the unselected interstage transformer in a sense opposite to the sense of current flow in the bias winding 6 of output transformer 9. Thus, in the position shown for switches 21, 22 and 23 (whereby interstage transformer 10 is selected by switch 21), bias current flows through winding 7 of selected transformer 10 in the same sense that the bias current flows in winding 6. Bias current flow in winding 8 of unselected interstage transformer 11 is in the sense opposite to the sense of bias current flow in windings 6 and 7. As a result, transformers 9 and 10 are driven into negative saturation and transformer 11 is driven into positive saturation, for the switch positions shown, each time that charging current flows into the selected low level storage element.

After the selected low level storage element is fully charged, it is discharged by the triggering of the silicon controlled rectifier shunt switch 24. For the position of switch 21 shown, charged capacitor 5 is discharged via transformer 10 into a high level storage element comprising secondary winding 30 of transformer 10 and capacitor 31. The detailed manner in which transformer 10 as well as transformers 9 and 11 are driven into and out of saturation during each cycle of operation will be explained later. Capacitor 31 subsequently is discharged through the primary winding 27 of output transformer 9 for the pulsed energization of a load (not shown) connected between output terminals 28 and 29.

Provision is made in the present invention for the selection of either one of two different pulse widths for delivery to the load. Ganged switches 21, 22 and 23 are moved into a position opposite to the one shown in FIGURE 1 in order to change the width of the output pulse. In the position opposite the one shown, inductor 19, primary 20 of transformer 11 and capacitor 4 are connected in the resonant charging circuit which includes inductance 3, the bias windings 6, 7 and 8, saturable reactor 14, charging diode 15 and saturable reactor 16. The value of the inductance 19 and the capacitance 4 differs from the values of the inductance 17 and the capacitance 5 in accordance with the design of the associated high level energy storage element. Network 25 is the high level storage element associated with capacitor 4 and comprises a three section pulse forming network delay line. The input section of the delay line consists of the saturated inductance of secondary winding 26 of transformer 11 and capacitor 32. Network 25, like the previously described high level storage element comprising secondary winding 30 and capacitor 31, is connected across the primary winding 27 of output transformer 9. Thus, switch 21 selects one of two alternative energy storage means for delivering a respective pulse of predetermined width to the same primary winding 27 of output transformer 9. For the shown position of switch 21, the selected energy storage means comprises a low level storage element 17, 18 and 5 and a cascaded high level storage element 30 and 31. In the other position of switch 21, the selected energy storage means would comprise low level storage element 19, 20 and 4 and high level storage means 25 (including the saturated inductance of 26).

It will be noted that switch 21, whose position determines the width of the output pulse, is located in the low voltage portion of the pulse modulator. High voltage switching components and the problems associated therewith are eliminated. The elimination of high voltage switching, however, introduces a new problem attributable to the fact that the unselected as well as the selected energy storage means are permanently connected across the primary winding 27 of output transformer 9. Consequently, some provision must be made for effectively isolating the unselected energy storage means for the output transformer 9 without resort to mechanical switching in the high voltage portion of the modulator. This desirable result is accomplished in accordance with the present invention through the use of bias windings 6, 7 and 8 and the operation of switches 22 and 23 which determine the direction of the current flow in the bias windings.

The magnetization curves of FIGURE 2 are helpful towards understanding the effect of the bias windings 6, 7 and 8 upon the operation of transformers 9, 10 and 11 of FIGURE 1. Assuming initially that no charge is present on either capacitor 4 or 5 and that switches 21, 22 and 23 are in the positions shown, a cycle of operation is initiated with the flow of capacitor charging current through the series-connected bias windings 9, 10 and 11. As previously mentioned, the sense of the charging current in the bias windings is determined by the positions of switches 22 and 23 and is such that transformers 9 and 10 are driven into a state of negative saturation whereas transformer 11 is driven into a state of positive saturation. It will be noted that transformer 10 is "selected" by switch 21 in the sense that switch 21 in the position shown selects primary winding 18 associated with transformer 10. Thus, the selected interstage transformer 10 and the output transformer 9 are driven into like states of saturation whereas the unselected interstage transformer 11 is driven into the opposite state of saturation by the initial capacitor charging current.

When capacitor 5 is fully charged, the charging current ceases and each of the transformers 9, 10 and 11 assume respective remanent states. The remanent states are represented by points I on the magnetization curves of FIGURE 2. Curve A of FIGURE 2 corresponds to interstage transformer 10, curve B corresponds to interstage transformer 11 and curve C corresponds to output transformer 9. Upon the firing of switch 24, charged capacitor 5 begins to discharge through primary winding 18 of transformer 10 in a direction causing excursion along the magnetization curve A in a direction toward but not all the way to positive saturation as represented by point II. Thus, transformer 10 is operated in its non-saturated linear region during the time when capacitor 5 discharges into its associated high level storage element comprising secondary winding 30 and capacitor 31. The charging of capacitor 31 causes a current flow in the primary winding 27 of output transformer 9. However, by reference to curve C, it can be seen that the output transformer is driven from remanent point I into negative saturation (point II) during the charging of capacitor 31, thereby effectively isolating the secondary of transformer 9 and the load coupled to terminals 28 and 29. Due to the fact that the secondary winding 26 of unselected transformer 11 is coupled with network 25 across primary winding 27 of output transformer 9, a small current also flows through winding 26. The current is small because transformer 9 is in saturation at this time and, being small, is insufficient to drive transformer 11 from remanent point I (curve B) into negative saturation. Actually, the small current flow in winding 26 is of the sense to drive transformer 11 from remanent point I towards negative saturation but not beyond point II. Upon the completion of the discharge of capacitor 5 into capacitor 31, transformer 10 reaches the positive saturation point represented by point III of curve A and transformers 9 and 11 shift to remanent point III at the same position as point I on respective curves C and B.

The saturation of transformer 10 presents a sudden low impedance to charged capacitor 31 and initiates its discharge. The sense of the discharging current through winding 30 drives transformer 10 further into positive saturation as represented by point IV of waveform A. The sense of the same discharging current drives transformer 9 toward positive saturation to the position of point IV on curve C whereby transformer 9 is operated in its linear region and effectively couples the load (across terminals 28 and 29) to capacitor 31. The sense of the discharging current is such that transformer 11, whose secondary 26 is connected with network 25 across winding 27 of output transformer 9, is driven from remanent point III (curve B) toward negative saturation but not beyond point IV. It should be especially noted that unselected transformer 11 remains in an unsaturated or high impedance condition for the entire interval between the completion of the initial charging of the capacitor 5 and the final discharging of capacitor 31. The high impedance of the unselected network produces negligible loading effect upon the primary winding 27 of output transformer 9 whereby the unselected network is effectively isolated from interfering with the operation of the components in active use. The selected transformer 10 and the output transformer 9, however, are operated at various times in each of their linear and saturated regions during each cycle of operation.

When the discharging of capacitor 31 is completed, and current ceases to flow in the windings of transformers 9, 10 and 11, each transformer assumes the magnetization level represented by the respective remanent point V. A new cycle of operation commences after the silicon controlled rectifier 24 recovers and charging current again flows through bias windings 6, 7 and 8 as previously described. Thus, the transformers are reset from the final remanent points V to the initial remanent points I.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A selectable pulse width modulator comprising
first and second energy storage means each having an input terminal and an output terminal,
the output terminals of said storage means being coupled to a common load,
each said storage means comprising a low level energy storage element and a high level energy storage element connected in cascade through a saturable transformer,
a source of charging current,
switching means for selectively coupling the input terminal of one of said storage means to said source,
means connected to the selected storage means for discharging the low level energy storage element into the high level energy storage element through the respective saturable transformer and for discharging the high level energy storage element into said load, and
means for maintaining the transformer of the unselected storage means in a non-saturated condition during the discharging of the high level energy storage element of the selected means.

2. A selectable pulse width modulator comprising
first and second energy storage means each having an input terminal and an output terminal,
the output terminals of said storage means being coupled to a common load,
each said storage means comprising a low level energy storage element and a high level energy storage element connected in cascade through a saturable transformer,
a source of charging current,
switching means for selectively coupling the input terminal of one of said storage means to said source,
means connected to the selected storage means for discharging the low level energy storage element into the high level energy storage element through the respective saturable transformer and for discharging the high level energy storage element into said load, and
means for maintaining the transformer of the unselected storage means in a non-saturated condition during the discharging of the low level energy storage element and during the discharging of the high level energy storage element of the selected means.

3. Apparatus comprising,
first and second energy storage means each having an input terminal and an output terminal,
the output terminals of said storage means being coupled to a common load,
each said storage means comprising a low level energy storage element and a high level storage element connected in cascade through a saturable transformer,
each transformer having a bias winding for driving the respective transformer into saturation,
a source of charging current,
first and second synchronously operable switching means,
said first switching means selectively coupling the input terminal of one of said storage means to a circuit point, and
said second switching means connecting said bias windings in opposite senses in series circuit between said source and said circuit point.

4. Apparatus comprising,
first and second energy storage means each having an input terminal and an output terminal,
a saturable output transformer,
the output terminals of said storage means being coupled to a common load through said saturable output transformer,
each said storage means comprising a low level energy storage element and a high level energy storage element connected in cascade through a respective interstage saturable transformer,
each transformer having a bias winding for driving the respective transformer into saturation,
a source of charging current,
first and second synchronously operable switching means,
said first switching means selectively coupling the input terminal of one of said storage means to a circuit point, and
said second switching means connecting the bias winding of the selected interstage transformer and the bias winding of said output transformer in opposite sense with the bias winding of the unselected interstage transformer in series circuit between said source and said circuit point.

5. A selectable pulse width modulator comprising,
first and second energy storage means each having an input terminal and an output terminal,
a saturable output transformer,
the output terminals of said storage means being coupled to a common load through said saturable output transformer,
each said storage means comprising a low level energy storage element and a high level energy storage element connected in cascade through a respective interstage saturable transformer,
each transformer having a bias winding for driving the respective transformer into saturation,
a source of charging current,
first and second synchronously operable switching means,
said first switching means selectively coupling the input terminal of one of said storage means to a circuit point,
said second switching means connecting the bias winding of the selected interstage transformer and the bias winding of said output transformer and in opposite sense with the bias winding of the unselected transformer in a series circuit between said source and said circuit point, and
means connected to the selected storage means for discharging the low level energy storage element into the high level energy storage element through the respective saturable transformer and for discharging the high level energy storage element into said load through said saturable output transformer.

References Cited

UNITED STATES PATENTS

| | | | |
|---|---|---|---|
| 2,674,691 | 4/1954 | Krulikoski, et al. | 328—61 X |
| 2,743,360 | 4/1956 | Stanton et al. | 307—106 X |
| 2,904,706 | 9/1959 | Romanelli | 307—106 |
| 3,337,755 | 8/1967 | Grabowski et al. | 320—1 |

BERNARD KONICK, *Primary Examiner.*

J. F. BREIMAYER, *Assistant Examiner.*

U.S. Cl. X.R.

307—108, 109, 265; 320—1; 328—58, 61, 65